(12) United States Patent
Paskiewicz et al.

(10) Patent No.: US 11,368,501 B1
(45) Date of Patent: Jun. 21, 2022

(54) APPARATUS, METHODS, AND SYSTEMS FOR FORMATTING DOCUMENTS FOR MULTI-DEVICE WEB CONFERENCING

(71) Applicant: Hercules Solutions LLC, New York, NY (US)

(72) Inventors: Rainer Paskiewicz, Guilford, CT (US); Darren Yip, New Haven, CT (US); Anton Warendh, New York, NY (US); Marc Feigen, New York, NY (US)

(73) Assignee: Hercules Solutions LLC, New Haven, CT (US)

( * ) Notice: Subject to any disclaimer, the term of this patent is extended or adjusted under 35 U.S.C. 154(b) by 0 days.

(21) Appl. No.: 16/847,249

(22) Filed: Apr. 13, 2020

(51) Int. Cl.
*H04L 65/1089* (2022.01)
*G06F 40/151* (2020.01)
(Continued)

(52) U.S. Cl.
CPC ........ *H04L 65/1089* (2013.01); *G06F 40/151* (2020.01); *H04L 65/4023* (2013.01); *H04L 65/4053* (2013.01); *H04L 51/066* (2013.01)

(58) Field of Classification Search
CPC ... H04L 51/066; G06F 16/958; G06F 40/103; G06F 16/957; G06F 16/9574; G06F 16/9577; G06F 16/986; G06Q 10/10
See application file for complete search history.

(56) References Cited

U.S. PATENT DOCUMENTS 8,135,776 B2 3/2012 Bremer, Jr.
8,291,315 B2 10/2012 Gormish et al.
(Continued)

FOREIGN PATENT DOCUMENTS

JP 2018-106538 A 7/2018

OTHER PUBLICATIONS

Hanumanthappa, M. et al., "Identification and extraction of different objects and its location from a Pdf file using efficient information retrieval tools," 2015 International Conference on Soft Computing and Network Security (ICSNS-2015), Feb. 25-27, 2015, Coimbatore, India, 6 pages.

(Continued)

*Primary Examiner* — Tom Y Chang
(74) *Attorney, Agent, or Firm* — Cooley LLP

(57) ABSTRACT

In some embodiments, a method can include connecting, via an application stored in a browser cache of a presenter compute device, to a synchronized mesh server endpoint. The synchronized mesh server endpoint establishes a session between the presenter compute device and multiple audience compute devices. The method can further include formatting each page from multiple pages of a portable document format (PDF) to a unique scalable vector graphics (SVG) representation from multiple SVG representations, such that the multiple SVG representations are stored in the browser cache when the multiple pages are formatted. The PDF file includes the multiple pages and multiple tags. The method further includes uploading the multiple SVG representations and the multiple tags to the synchronized mesh server endpoint. The method further includes clearing the application from the browser cache, after the uploading and when an end-of-session message is received from the synchronized mesh server endpoint.

21 Claims, 5 Drawing Sheets

(51) Int. Cl.
_H04L 65/4053_ (2022.01)
_H04L 65/401_ (2022.01)
_H04L 51/066_ (2022.01)

(56) References Cited

U.S. PATENT DOCUMENTS

| | | | |
|---|---|---|---|
| 8,645,819 B2 | 2/2014 | Dejean | |
| 8,878,851 B2 | 11/2014 | Opala et al. | |
| 9,213,684 B2 | 12/2015 | Lai et al. | |
| 9,886,426 B1 | 2/2018 | Taylor | |
| 2003/0126136 A1* | 7/2003 | Omoigui | H04L 29/06 |
| 2007/0226314 A1* | 9/2007 | Eick | G06F 16/986 |
| | | | 709/217 |
| 2007/0244867 A1* | 10/2007 | Malandain | G06F 16/313 |
| 2012/0059822 A1 | 3/2012 | Malandain et al. | |
| 2012/0063573 A1* | 3/2012 | Sylvain | H04M 3/42221 |
| | | | 379/67.1 |
| 2015/0185994 A1* | 7/2015 | Antipa | G06F 40/106 |
| | | | 715/201 |
| 2016/0125493 A1* | 5/2016 | Furunzhyieu | G06Q 30/0621 |
| | | | 705/26.5 |
| 2017/0235537 A1* | 8/2017 | Liu | H04L 67/18 |
| | | | 715/759 |
| 2017/0277663 A1 | 9/2017 | Reimherr et al. | |
| 2018/0081860 A1 | 3/2018 | Nishida | |

OTHER PUBLICATIONS

Business Editors/High-Tech Writers. TextCafe version 3.0 now supports SVG; generates scalable vector graphics, enhanced navigation XML, document indexes. Nov. 2002. Business Wire, Retrieved from the Internet: <URL: http://dialog.proquest.com/professional/docview/446386876?accountid=157282>, 4 pages.

Mobius Introduces New Technology for Web Content Presentment; Automatic Content Presentment Transforms Enterprise Content for the Web. Oct. 2001. Business Wire, Retrieved from the Internet: <URL: http://dialog.proquest.com/professional/docview/1072824183?accountid=157282>, 4 pages.

\* cited by examiner

200

Send an application from a controller device to a compute device and a set of audience devices, to cause the application to load in a browser cache of the compute device and a browser cache of each audience device from the set of audience devices, in response to receiving the application 201

Receive an indication of a selection of a portable document format (PDF) file to be loaded on the compute device, the PDF file having a set of pages and a set of tags 202

Format, on a per-page basis, at least one page from the set of pages of the PDF file to at least one scalable vector graphics (SVG) representation from a set of SVG representations such that the at least one SVG representation from the set of SVG representations is stored in the browser cache of the compute device 203

Store an association of the set of tags with the set of SVG representations 204

Upload the set of SVG representations and the set of tags to a synchronized mesh server endpoint to cause the synchronized mesh server endpoint to:
a) establish a chat session between the compute device and the set of audience devices,
b) send the at least one SVG representation from the set of SVG representations to the compute device and the set of audience devices, and
c) send an end-of-session message to the compute device and the set of audience devices to clear the application from the browser cache of the compute device and the browser cache of each audience device from the set of audience devices, in response to receiving the end-of-session message 205

Connect, via an application stored in a browser cache of a compute device, to a synchronized mesh server endpoint that is configured to establish a chat session between the compute device and a set of audience devices 301

→

Format each page from a set of pages of a portable document format (PDF) to a unique scalable vector graphics (SVG) representation from a set of SVG representations, such that the set of SVG representations are stored in the browser cache in response to the set of pages being formatted, the PDF file including the set of pages and a set of tags 302

→

Upload the set of SVG representations and the set of tags to the synchronized mesh server endpoint 303

→

Clearing the application from the browser cache, after the uploading and in response to receiving an end-of-session message from the synchronized mesh server endpoint 304

FIG. 3

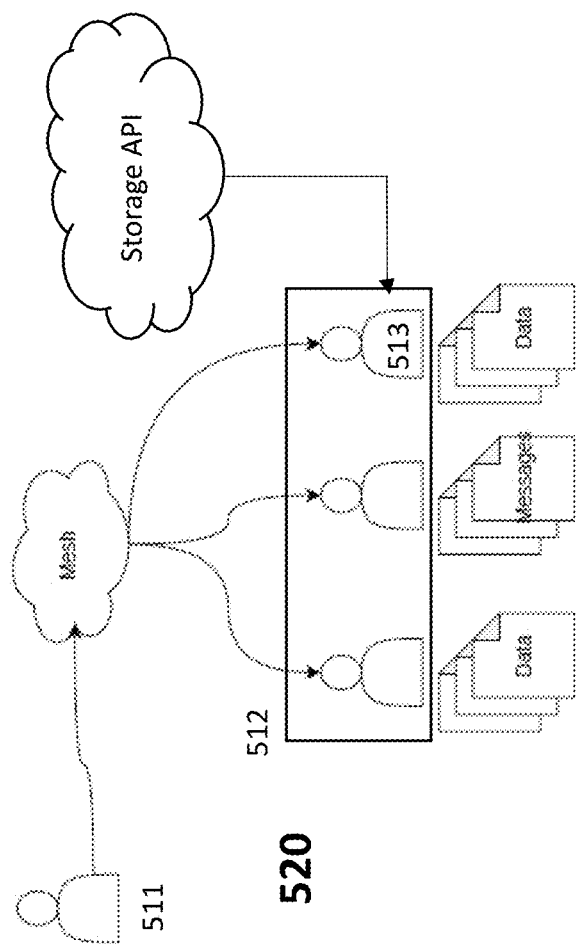
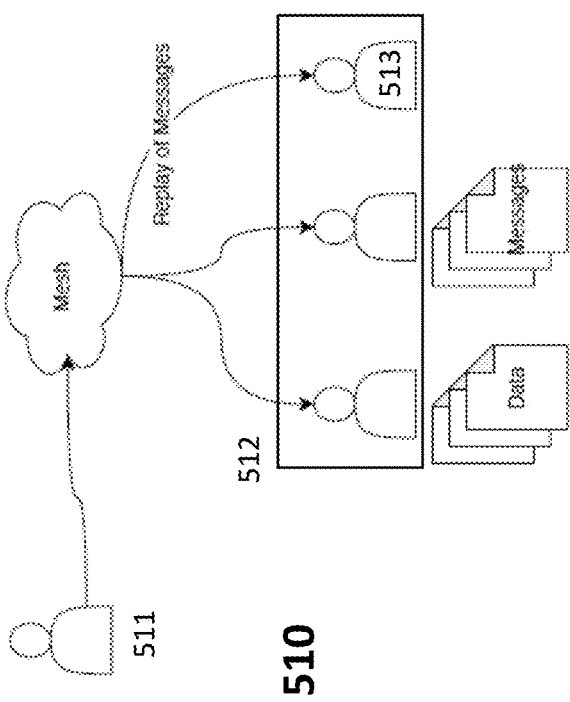
FIG. 5

US 11,368,501 B1

APPARATUS, METHODS, AND SYSTEMS FOR FORMATTING DOCUMENTS FOR MULTI-DEVICE WEB CONFERENCING

TECHNICAL FIELD

The present disclosure relates to the field of document processing, and in particular to methods and apparatus for loading a web-conferencing application in web browsers of compute devices participating multi-device web conferencing. The web-conferencing application formats documents for a reliable and secure presentation to the compute devices.

BACKGROUND

Multi-device web conferencing, such as chat sessions, webinars, and/or electronic meeting systems are known methods for communication. Known multi-device web conferencing typically involve setting up the software environment of a compute device participating in the multi-device conferencing that can be unreliable and involve security risks. Thus, a need exists for apparatus, methods, and systems that enable more reliable and secure multi-device web conferencing without local software installation.

SUMMARY

In some embodiments, a method can include connecting, via an application stored in a browser cache of a presenter compute device, to a synchronized mesh server endpoint. The synchronized mesh server endpoint establishes a chat session between the presenter compute device and multiple audience compute devices. The method further includes formatting each page from multiple pages of a portable document format (PDF) to a unique scalable vector graphics (SVG) representation from multiple SVG representations, such that the multiple SVG representations are stored in the browser cache when the multiple pages are formatted. The PDF file includes the multiple pages and multiple tags. The method further includes uploading the multiple SVG representations and the multiple tags to the synchronized mesh server endpoint. The method further includes clearing the application from the browser cache, after the uploading and when an end-of-session message is received from the synchronized mesh server endpoint.

BRIEF DESCRIPTION OF THE DRAWINGS

FIG. 2 is a flowchart of a method of communication via a synchronized mesh server endpoint, according to an embodiment.
FIG. 3 is a flowchart of a method of communication via a synchronized mesh server endpoint, according to an embodiment.
FIG. 5 is a block diagram that illustrate a web conferencing system, according to an embodiment.

DETAILED DESCRIPTION

Non-limiting examples of various aspects and variations of the embodiments are described herein and illustrated in the accompanying drawings.

One or more embodiments described herein are methods, apparatus, and systems by which a set of users can reliably and securely attend and/or participate in a web conferencing. The methods, apparatus, and systems enables an automated workflow for creating, managing, coordinating, and sharing complex data representations during a high stakes/high stress session on a web-enabled application. In some embodiments, the set of users do not need a local software installation to attend and/or participate in the web conferencing. As such the methods, apparatus, and systems described hereby can provide reliable, secure, and disposable communication among the set of users during the web conferencing.

Figure 1:
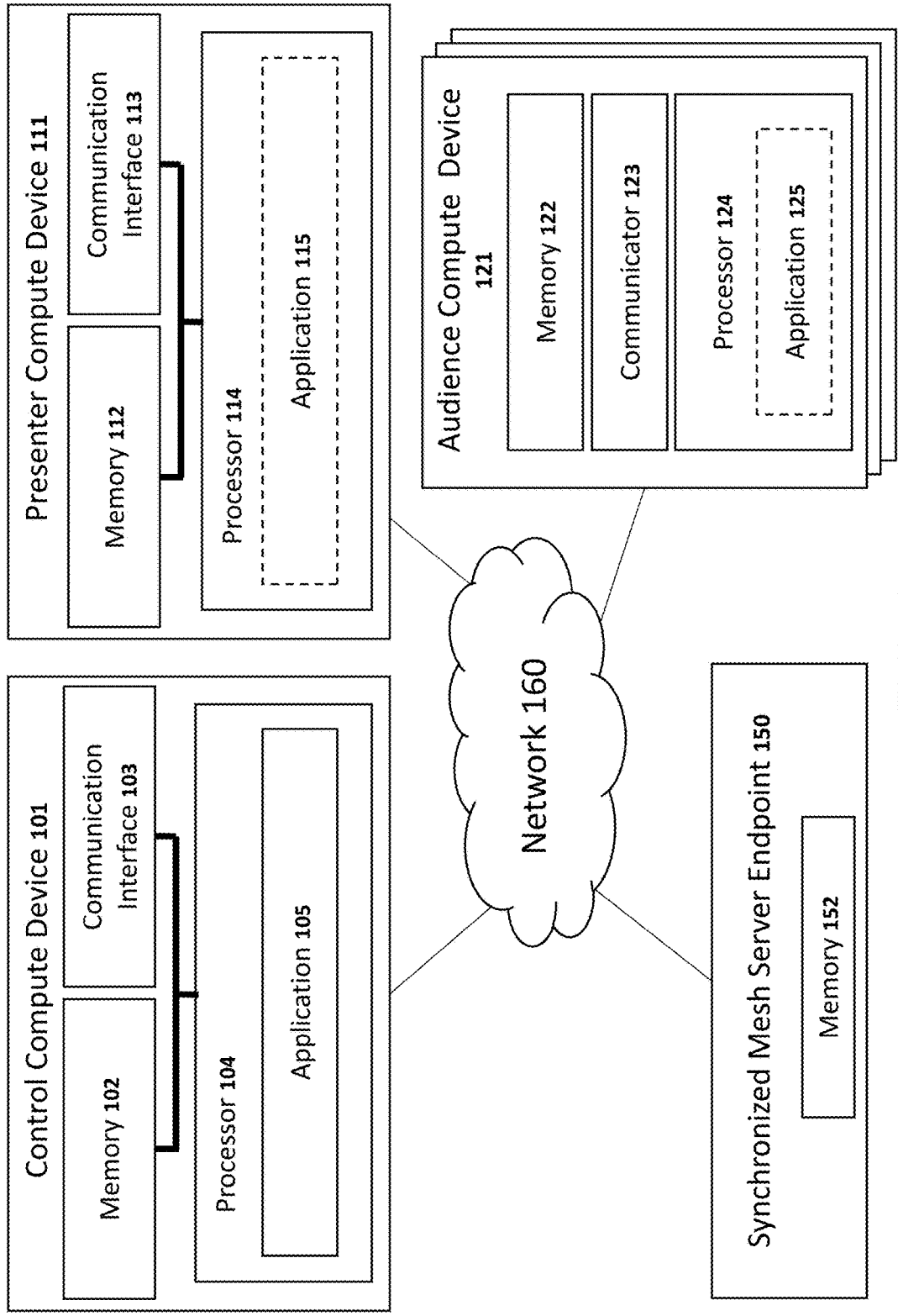
FIG. 1 is a block diagram that illustrates a web conferencing system, according to an embodiment.

FIG. 1 is a block diagram that illustrates a web conferencing system 100, according to an embodiment. The web conferencing system 100 includes a control compute device 101 used to transmit, via a synchronized mesh server endpoint 150 communicatively coupled to a network 160, an application 105 such as, for example, a browser-based application, to a presenter compute device 111 and a set of audience compute devices 121 of the web conferencing system 100. The web conferencing system 100 includes the presenter compute device 111 that is used to transmit, via the synchronized mesh server endpoint 150 communicatively coupled to the network 160, a set of documents (e.g., a portable document files (PDFs)) to the set of audience compute devices 121 of the web conferencing system 100. The web conferencing system 100 also includes the set of audience compute devices 121 that receive, via the synchronized mesh server endpoint 150 communicatively coupled to the network 160, the application 105 and/or the set of documents (not shown) from the control compute device 101 and/or the presenter compute device 111. The web conferencing system 100 includes the synchronized mesh server endpoint 150 that enables transmission of the application 105 and the set of documents to the set of participating devices of the web conferencing system 100 via the network 160. The control compute device 101, the presenter compute device 111, and/or the set of audience compute devices 121 each can be and/or include a hardware-based computing device and/or a multimedia device, such as, for example, a computer, a desktop, a laptop, a smartphone, a tablet, a wearable electronic device, and/or the like.

The synchronized mesh server endpoint 150 can be and/or include an application programming interface (API) server and/or service mesh that can be accessed, via a network 160, by the control compute device 101, the presenter compute device 111, and/or the set of audience compute devices 121. In some implementations, the API server can be accessed by the control compute device 101, the presenter compute device 111, and/or the set of audience compute devices 121 via an API gateway communicatively coupled to the network 160. The API gateway can accept and process an API call(s), a data access control(s), an authorization(s), an API version management(s), and/or the like. Moreover, the synchronized mesh server endpoint 150 can also generate an end-of-session message to the control compute device 101, the presenter compute device 111, and/or the set of audience compute devices 121 upon an indication of an end-of-session message is received from an authorized user to generate the end-of-session message.

The network 160 can be digital telecommunication network of servers, routers, bridges, and/or compute devices that enable data communication between the control compute device 101, the presenter compute device 111, the set of audience compute devices 121, and the synchronized mesh server endpoint 150. The servers and/or computes device of the network 160 can be connected via one or more wired or wireless communication networks (not shown) to share resources such as, for example, data, data storage, and/or computing power. The wired or wireless communication networks between servers and/or compute devices of the network 160 can include one or more communication channels, for example, a radio frequency (RF) communication channel(s), an extremely low frequency (ELF) communication channel(s), an ultra-low frequency (ULF) communication channel(s), a low frequency (LF) communication channel(s), a medium frequency (MF) communication channel(s), an ultra-high frequency (UHF) communication channel(s), an extremely high frequency (EHF) communication channel(s), a fiber optic commination channel(s), an electronic communication channel(s), a satellite communication channel(s), and/or the like. The network 160 can be, for example, the Internet, an intranet, a local area network (LAN), a wide area network (WAN), a metropolitan area network (MAN), a worldwide interoperability for microwave access network (WiMAX®), a virtual network, any other suitable communication system and/or a combination of such networks.

The control compute device 101 includes a memory 102, a communication interface 103, and a processor 104. The control compute device 101 can additionally include peripheral components such as for example, a keyboard, a mouse, a printer, an external memory card, and/or the like (not shown). The processor 104 is connected to (without intervening components) or coupled (with or without intervening components) to the memory 102 and the communication interface 103. The memory 102 is connected or coupled to the communication interface 103, respectively. The control compute device 101 can be a compute device with any size and/or computing power (e.g., a smart phone, a tablet, a laptop, a desktop, a mainframe computer, and/or the like) configured to send and receive data (e.g., a text message, a file, a voice stream, a video stream, and/or the like) and/or control signal (e.g., a command to begin a session, a command to end a session, and/or the like) from the network 160. The control signal sent and received from the control compute device 101 can cause a compute device from the control compute device 101, the presenter compute device 111, and the set of audience devices 121 to communicate (e.g., send/receive an application, send/receive a text message, and/or the like) with the other compute devices. The control compute device 101 can send for example an application 105, via the synchronized mesh server endpoint 150, to the presenter compute device 111 and the set of audience compute devices 121.

The memory 102 of the control compute device 101 can be, for example, a memory buffer, a random access memory (RAM), a read-only memory (ROM), a hard drive, a flash drive, a secure digital (SD) memory card, a compact disk (CD), an external hard drive, an erasable programmable read-only memory (EPROM), an embedded multi-time programmable (MTP) memory, an embedded multi-media card (eMMC), a universal flash storage (UFS) device, and/or the like. The memory 102 can include and/or store one or more software modules, libraries, codes, and/or instructions to cause the processor 104 to perform one or more processes and/or functions of the application 105 such as, for example, a PDF rendering process library.

The communication interface 103 of the control compute device 101 can be a hardware component of the control compute device 101 connected or operatively coupled to the processor 104 and/or the memory 102. In some instance, the communication interface 103 can be, for example, a network interface card (NIC), a Wi-Fi™ module, a Bluetooth® module, an optical communication module, and/or any other suitable wired and/or wireless communication interface. The communication interface 103 can be configured to connect the control compute device 101 to the network 160, as described in further detail herein. In some instances, the communication interface 103 can facilitate receiving or transmitting data via the network 160. More specifically, in some instances, the communication interface 103 can facilitate receiving or transmitting, via the network 160, an application 105 and/or a set of documents (not shown) from/to the presenter compute device 111, the set of audience compute devices 121, and/or the synchronized mesh server endpoint 150, each communicatively coupled, via the network 160, to the control compute device 101. In some instances, data received via communication interface 103 can be processed by the processor 104 or stored in the memory 102, as described in further detail herein.

The processor 104 of the control compute device 101 can be, for example, a hardware based integrated circuit (IC) or any other suitable processing device configured to run and/or execute a set of instructions or code. For example, the processor 104 can be a general purpose processor, a central processing unit (CPU), an accelerated processing unit (APU), an application-specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. The processor 104 can be operatively coupled to the memory 102 through a system bus (for example, address bus, data bus and/or control bus; not shown). The processor 104 can execute the application 105 that includes, for example, a PDF rendering process library. The PDF rendering process library can be stored in the memory 102 and executed by the processor 104. For example, code to cause the processor 104 to execute the PDF rendering process library, can be stored in the memory 102.

The application 105 can be configured to enable the control compute device 101 to connect, via the network 160, to the synchronized mesh server endpoint 150. The application 105 can be configured further to enable the control compute device 101 to communicate, via the synchronized mesh server endpoint 150, with the presenter compute device 111 and/or the set of audience compute devices 121, to exchange messages in a chat session, to format files, and/or upload the formatted files to the synchronized mesh server endpoint 150. The application 105 implemented by the processor 104 can include a PDF rendering process library. The PDF rendering process library can convert a PDF page to a scalable vector graphics (SVG) representation, described hereby in further details.

In some implementations, the memory 102 can store instructions to cause the processor 104 to execute modules, processes and/or functions associated with implementing the PDF rendering process library of the application 105. The memory 102 can store a set of files associated with (e.g., generated by executing) the PDF rendering process library. For example, the set of files associated with the PDF rendering process library can include temporary variables, return memory addresses, variables, and/or the like, generated during the operation of the PDF rendering process library.

The presenter compute device 111 includes a memory 112, a communication interface 113, and a processor 114. The presenter compute device 111 can additionally include peripheral components such as for example, a keyboard, a mouse, a printer, an external memory card, and/or the like (not shown). The processor 114 is connected to (without intervening components) or coupled (with or without intervening components) to the memory 112 and the communication interface 113. The memory 112 is connected or coupled to the communication interface 113, respectively. The presenter compute device 111 can be a compute device with any size and/or computing power (e.g., a smart phone, a tablet, a laptop, a desktop, a mainframe computer, and/or the like) configured to send and receive data (e.g., a text message, a file, a voice stream, a video stream, and/or the like) and/or control signal (e.g., a command to begin a session, a command to erase (clear) the memory 112, and/or the like) from the network 160.

The memory 112 of the presenter compute device 111 can be structurally and/or functionally similar to the memory 102 of the control compute device 101. The memory 112 can include and/or store one or more software modules, libraries, codes, and/or instructions to cause the processor 114 to perform one or more processes and/or functions such as, for example, a PDF rendering process library.

The communication interface 113 of the presenter compute device 111 can be structurally and/or functionally similar to the communication interface 103 of the control compute device 101. The communication interface 113 can facilitate receiving and/or transmitting, via the network 160, an application and/or a set of documents from/to the presenter control device 111, the set of audience compute devices 121, and/or the synchronized mesh server endpoint 150, each communicatively coupled, via the network 160, to the presenter compute device 111.

The processor 114 of the presenter compute device 111 can be structurally and/or functionally similar to the processor 104 of the control compute device 101. The processor 114 can be operatively coupled to the memory 112 through a system bus (for example, address bus, data bus and/or control bus). The processor 114 can implement an application 115 (similar to the application 105 as described with respect to the control compute device 101). The application 115 can be software stored in the memory 112 and executed by the processor 114. In some configurations, the application 115 of the presenter compute device 111 can be a copy of the application 105 of the control compute device 101, implemented in the control compute device 101. In one example, the application 115 can include a JavaScript set of codes that are implemented in a Firefox® web browser of the control compute device 101 that is running on a Windows® operating system.

An audience compute device from the set of audience compute devices 121 includes a memory 122, a communication interface 123, and a processor 124. The audience compute device can additionally include peripheral components such as for example, a keyboard, a mouse, a printer, an external memory card, and/or the like (not shown). The processor 124 is connected to (without intervening components) or coupled (with or without intervening components) to the memory 122 and the communication interface 123. The memory 122 is connected or coupled to the communication interface 123, respectively. The audience compute device can be a compute device with any size and/or computing power (e.g., a smart phone, a tablet, a laptop, a desktop, a mainframe computer, and/or the like) configured to send and receive data (e.g., a text message, a file, a voice stream, a video stream, and/or the like) and/or control signal (e.g., a command to begin a session, a command to erase (clear) the memory 122, and/or the like) from the network 160.

The memory 122 of an audience compute device from the set of audience compute devices 121 can be structurally and/or functionally similar to the memory 102 of the control compute device 101. The memory 122 can include and/or store one or more software modules, libraries, codes, and/or instructions to cause the processor 124 to perform one or more processes and/or functions such as, for example, an application 125 (similar to the application 105 as described with respect to the control compute device 101), received via the network 160.

The communication interface 123 of an audience compute device from the set of audience compute devices 121 can be structurally and/or functionally similar to the communication interface 103 of the control compute device 101. The communication interface 123 can facilitate receiving and/or transmitting, via the network 160, the application 125 and/or a set of documents from/to the control device 101, the presenter compute device 111, and/or the synchronized mesh server endpoint 150, each communicatively coupled, via the network 160, to the audience compute device.

The processor 124 of an audience compute device from the set of audience compute devices 121 can be structurally and/or functionally similar to the processor 104 of the control compute device 101. The processor 124 can be operatively coupled to the memory 122 through a system bus (for example, address bus, data bus and/or control bus, not shown). The processor 124 can implement the application 125. The application 125 can be software stored in the memory 122 and executed by the processor 124. For example, code to cause the processor 124 to execute a PDF rendering process library of the application 125, can be stored in the memory 122. In some configurations, the application 125 of an audience compute device from the set of audience compute devices 121 can be a copy of the application 105 of the control compute device 101, implemented in the audience compute device. In one example, the application 125 can include a Python set of codes that are implemented in a Chrome® web browser of the audience compute device that is running on a Linux® operating system.

The control compute device 101, the presenter compute device 111, and/or the set of audience compute devices 121 include and/or implement at least one browser that can be configured to load an application such as, for example, the application 105, the application 115, and/or the application 125 in the memory 102, the memory 112, and/or the memory 122. The at least one browser complies with at least one standard defined by the World Wide Web Consortium (W3C).

In some implementations, each audience compute device from the set of audience compute devices 121 can send/receive a message (e.g., chat message, files, file references, and/or the like), via the synchronized mesh server endpoint 150, to/from the remaining audience compute device from the set of audience compute devices 121, to/from the control compute device 101, and/or to/from the presenter compute device 111. As such, each audience compute device can interact with the remaining set of audience compute devices from the set of audience compute devices 121.

As shown in FIG. 1, the control compute device 101 can send an application (e.g., a copy of the application 105) to the presenter compute device 111 and/or the set of audience compute devices 121, via a network 160. The sent application can be stored and implemented as application 115, and be loaded in a browser cache of a browser of the presenter compute device 111. The sent application can be stored and implemented as application 125, and be loaded in a browser cache of a browser of an audience compute device from the set of audience compute devices 121. The application 105 can be also loaded in a browser cache of a browser of the control compute device 101. The presenter compute device 111 can receive, from a user of the presenter compute device 111 via a peripheral device coupled to the presenter compute device 111, an indication of selection of a PDF file stored in the memory 112 of the presenter compute device 111, to be loaded to the synchronized mesh server endpoint 150 and be presented to a session (e.g., a chat session, a webinar, and/or electronic meeting). The PDF file can have a set of pages and/or a set of tags. The PDF file (including the set of pages and/or the set of tags) can then be loaded (can be also referred to herein as 'ingested'), using the application 115 of the presenter compute device 111, in the browser cache (e.g., using a Hyper Text Markup Language 5 (HTML5) file buffer within the memory 112). Upon loading the PDF file in the browser cache, a memory address reference to the PDF file in the browser cache is passed to a PDF rendering process library of the application 115 of the compute device 111. The PDF rendering process library of the application 115 of the presenter compute device 111 then formats the set of pages to a set of SVG representations on a per-page basis. The set of SVG representations can then be stored, using the application, 115 in the browser cache after the set of pages are formatted. The set of SVG representations and the set of tags can then be uploaded, using the application 115, to the synchronized mesh server endpoint 150 and stored in the memory 152. The presenter compute device 111 can subsequently erase (clear) the application 115 of the presenter compute device 111, in response to receiving an end-of-session message from the synchronized mesh server endpoint 150. Such an end-of-session message can be sent by a user of the presenter compute device 111 or a user of the control compute device 101 when the session has ended by the user.

The application (e.g., the application 105 of the control compute device 101 and/or the application 115 of the presenter compute device 111) can perform multiple processes in parallel. In some instances, the application performs a first process and a second process. The first process (also referred to as the "main state process") can include a controlling and maintaining a communication between the application and the synchronized mesh server endpoint 150. The application separates pages of the set of pages of the PDF file during the second process that is separate from the first process of the application. In the second process, the PDF rendering process library converts a given PDF page reference into an SVG representation without access to a document object model (DOM) of the browser. The application then confirms that the SVG representation contains no reference, such as images, fonts, colors, and/or the like, that points back to the PDF file, by checking the SVG representation against a known list of possible reference tags. The known list of possible reference tags can be list of reference tags that can contain external references that point back to the PDF file. If the SVG representation is found to include a tag that matches the known list of possible reference tags, the tag is replaced with an identical tag, such that a data reference of the tag is substituted with a valid base 64 encoded Binary large Object (blob). In some instances, the tag found to match the known list of possible reference tags can be replaced by a different tag or a comment line that contains no reference back to the PDF file. At this stage, a cycle of the second process is completed, the SVG representation, a string representation of the SVG representation, a relation of the SVG representation to the PDF file is returned to the first process. In some configurations, multiple processes similar to the second process can be executed in parallel. When the first process is notified of a set of SVG representation of the given PDF page have been processed in a second process, the set of SVG representations can be associated with a set of tags of the given PDF page. The set of tags can include a page index, a bookmark, a page title, an external reference, and/or the like. Once all second processes are complete, the PDF file and/or the SVG representation with associated tags are marked ready for upload. In one example, all second processes are complete once the set of PDF pages of the PDF file has been converted to the set of SVG representations and the set of tags, and once an association has taken place between the set of SVG representations and the set of tags.

Once the PDF file and/or the set of SVG representations with associated set of tags are marked ready for upload a JavaScript Object Notation (JSON) message can be sent, by the control compute device 101 and/or the presenter compute device 111, to a remote API server over a Hypertext Transfer Protocol Secure (HTTPS) transport layer security (TLS) secured POST request. The remote API server validates the HTTPS TLS secured request and issues a corresponding request to a database management service of the synchronized mesh server endpoint 150 over a General-Purpose Remote Procedure Calls (GRPC) connection over Transmission Control Protocol (TCP) with a TLS handshake via a middleman protocol. The TLS handshake is the process that initiates a communication session between the remote API server and the database management service of the synchronized mesh server endpoint 150 using TLS encryption. In result, a record is then created in a database of synchronized mesh server endpoint 150 and returned over the GRPC over TCP. Upon receipt of the record, the second process stores the set of SVG representations in a remote blob storage. Data in the remote blob storage can be accessed by the synchronized mesh server endpoint 150, but the remote blob storage cannot be accessed by the control compute device 101, the presenter compute device 111, and/or the set of audience devices 121. The set of SVG representations are then sent to the remote API server in series over HTTPS file transfer protocol. Each SVG representation is received by the remote API server, is fingerprinted, and then sent to the remote blob storage and/or the database of synchronized mesh server endpoint 150 over a GRPC connection over TCP secured with the TLS handshake via the middleman protocol. Once the SVG representation is confirmed as valid and/or whole, the SVG representation is then sent to the remote blob storage and/or the database of synchronized mesh server endpoint 150.

In some instances, the remote blob storage and/or the database of synchronized mesh server endpoint 150 are encrypted storages that confirm integrity of each SVG representation from the set of SVG representations. If an SVG representation from the set of SVG representations is found to have been tampered with or does not match a SVG representation signature of the SVG representation, or the set of SVG representations of the PDF file does not match a set of SVG representation signatures of the set of SVG representations and/or the PDF file signature of the PDF file, then the first process and/or the second process are aborted with a hard stop. In some implementations, the SVG representation signature, the set of SVG representation signatures, and the PDF file signature are a hashed memory signature of the SVG representation, a hashed memory signature of the set of SVG representations, and a hashed memory signature of the PDF, respectively. If the set of SVG representations of the PDF file are validated, the set of SVG representations are regrouped (e.g., using a rechunk command of Hierarchical Data Formats (HDFS)) and are sent into the encrypted storages.

In some instances, a user of the presenter compute device 111 and/or a user of an audience device from the set of audience device 121 can edit a file (e.g., annotate a SVG representation, annotate a PDF file) before sending the file to the session (e.g., chat session) via synchronized mesh server endpoint 150. In one example, the user of the audience device intends to draw attention of the user of the presenter device 111 and/or users of the remaining audience device from the set of audience devices 121 to a data point presented on an SVG representation received from the user of the presenter device 111. The user of the audience device 121 can draw a circle around the data point using the application 125 and/or any other appropriate software to generate an annotated SVG representation. The audience device 121 can be then configured to send the annotated SVG representation to the session via synchronized mesh server endpoint 150.

In some instances, a processor (such as the processor 104, the processor 114, the processor 124) of a compute device (such the control compute device 101, the presenter compute device 111, an audience compute device from the set of audience compute devices 121) can allocate a portion of a memory (such as memory 102, memory 112, and memory 112) of the compute device (referred to herein as "browser cache) to a browser pre-installed on the compute device. The browser cache can store a document file(s), a hypertext file(s), a style file(s), a script file(s), an image file(s), and/or the like to the memory of the compute device, allocated as temporary storage of the browser.

In some instances, the application 105 of the control compute device 101, the application 115 of the presenter compute device 111, and the application 125 of an audience compute device from the set of audience compute devices 121 can be copies of the same application. That is to say, the application 105, the application 115, and the application 125 can include the same set of codes and/or instructions in the same computer language such as, for example, JavaScript, Java, Python, and so forth.

In some instances, the application 105 of the control compute device 101, the application 115 of the presenter compute device 111, and the application 125 of an audience compute device from the set of audience compute devices 121 can be similar applications. That is to say, any of the application 105, the application 115, and the application 125 can have similar set of codes and/or instructions (including one or more modules not present and/or excluding one or more modules present in the remaining applications) in the same and/or a different computer language such as, for example, JavaScript, Java, Python, and so forth.

In some instances, a user of a presenter compute device 111 and/or a user of an audience compute device from a set of audience compute devices 121 can receive an indication of web conferencing (e.g., by a text message, by an email, by a notification on the presenter compute device 111 and/or the audience compute device). The user of the compute device 111 and/or the user of an audience compute device can provide a permission to load an application (e.g., application 115 and/or application 125) received via a control compute device 101 in a browser cache allocated to a pre-installed browser on the presenter compute device 111 and/or the audience compute device. Therefore, the application is then loaded to the presenter compute device 111 and/or the audience compute device temporarily, as to leave no (or minimal) lasting trace on the presenter compute device 111 and/or the audience compute device, once the application is deleted from the browser cache.

In some instances, the application can exchange, from any of a control compute device 101, a presenter compute device 111, and/or a set of audience compute device 121 to the remaining compute devices, a set of messages including a set of chat messages and/or a set of tags, in a chat session. A user of the presenter compute device 111 with an access right to use the application 115 can connect, via a secured connection, the presenter compute device 111 to the synchronized mesh server endpoint 150. A user of an audience compute device from the set of audience compute devices 121, with an access right to use the application 125 can connect, via a secured connection, the audience compute device to the synchronized mesh server endpoint 150. The access right can be granted, for example, upon entry of a verification code sent to an authentication device, upon entry of a password, and/or the like. The secure connection can be, for example, a secured connection over a transport layer security (TLS) secured websocket connection. A chat session is then created by sending, from the presenter compute device 111, a JavaScript Object Notation (JSON) payload to an API server over a Hypertext Transfer Protocol Secure (HTTPS) POST request method. On receipt of the JSON payload, sent form the control compute device 101 and/or the presenter compute device 111 and received by the API server, a join message is sent by the presenter compute device 111 and/or the audience compute device to the synchronized mesh server endpoint 150, and a set of secondary TLS secured web sockets are opened for different message types. In a separate pool of background second processes (described above in further details), previously-stored SVG representations are fetched, by the control compute device 101, the presenter compute device 111, and/or the set of audience compute device 121 from an encrypted storage described above, as related to the chat session (for example, one or more previously-stored SVG representations can be indicated by the user of the presenter compute device 111 as related to the chat session). On receipt of a new session message, an audience compute device from the set of audience compute devices 121 connects to a same secondary TLS secured websocket as an instantiating compute device (e.g., the presenter compute device 111). The previously-stored SVG representations are fetched as related to the chat session, on all audience compute devices to ensure that all users of the set of audience compute devices 121 have access to same data. The presenter compute device 111 and the set of audience compute device 121 then repeatedly can exchange messages by repeating the above process over the synchronized mesh server endpoint 150. The messages can include, for example, a text chat(s), a page reference(s), a prepared complex data reference(s), and/or the like.

In some implementations, at least one audience compute device from the set of audience compute device 121 joins the session (e.g., a chat session) after the application 115 of the presenter compute device 111 uploads the set of SVG representations and the set of tags to the synchronized mesh server endpoint 150. When the at least one audience compute device joins at any point in time (e.g., mid-session) during the session, the synchronized mesh server endpoint 150, to which the at least one audience compute device is communicatively coupled to, will transmit all previous messages (e.g., a text chat) to the audience compute device from a memory 152 of the synchronized mesh server endpoint 150. The synchronized mesh server endpoint 150 can send all of the previous messages for the session starting with a status message. The at least one audience compute device can then fetch files (e.g., SVG representations) from the API server, described above, while presenting all previous messages to the user. In some implementations, the memory 152 can be a non-persistent memory such that the all previous messages cannot continue to be accessed after an end-of-session message.

In some embodiments, the synchronized mesh server endpoint 150 can receive an indication of end-of-session (e.g., from a user of the control compute device 101 or from a user of the presenter compute device 111) and consequently generate the end-of-session message and transmit the end-of-session message to the control compute device 101, the presenter compute device 111, and/or the set of audience compute devices 121. Upon receiving an end-of-session message from the synchronized mesh server endpoint 150, the control compute device 101, the presenter compute device 111, and/or the set of audience compute devices 121 can erase (clear) the application 105, the application 115, the application 125 from the memory 102, the memory 112, and/or the memory 122, respectively. The control compute device 101, the presenter compute device 111, and/or the set of audience compute devices 121 can also erase (clear) all messages, all references, and all files received during the chat session from their respective browser cache. Moreover, the synchronized mesh server endpoint 105 the control compute device 101, the presenter compute device 111, and/or the set of audience compute devices 121 can further disconnect from any temporary websocket. Therefore, the application 105, the application 115, the application 125 has no lasting trace on the browser cache of the control compute device 101, the presenter compute device 111, and/or the set of audience compute devices 121, respectively, after receiving the end-of-session message and no lasting trace on the control compute device 101, the presenter compute device 111, and/or the set of audience compute devices 121 after receiving an instantiation of the end-of-session message.

In some implementations, the control compute device 101 can receive, from a user of the control compute device 101, an indication of selection of a PDF file stored in the memory 102 of the control compute device 101, to be loaded to the synchronized mesh server endpoint 150. The PDF file can have a set of pages and/or a set of tags. The PDF file (including the set of pages and/or the set of tags) can then be loaded, using the application 105 of the control compute device 101, in the browser cache (e.g., using an HTML5 file buffer). Upon loading the PDF file in the browser cache, a memory address reference to the PDF file in the browser cache is passed to a PDF rendering process library of the application 105 of the control compute device 101. The control compute device 101 can then erase (clear) the application the application 105 of the control compute device 101, in response to receiving an end-of-session message from the synchronized mesh server endpoint 150.

FIG. 2 is a flowchart of a method 200 of communication via a synchronized mesh server endpoint (such as the synchronized mesh server endpoint 150 as shown and described with respect to FIG. 1), according to an embodiment. At 201, an application (such as the application 105 as shown and described with respect to FIG. 1) can be sent from a control compute device (such as the control compute device 101 as shown and described with respect to FIG. 1) to a presenter compute device (such as the presenter compute device 111 as shown and described with respect to FIG. 1) and a set of audience compute devices (such as the set of audience compute devices 121 as shown and described with respect to FIG. 1), to cause the application to load in a browser cache of the presenter compute device and a browser cache of each audience compute device from the set of audience compute devices, in response to receiving the application. At 202, the control compute device can be configured to receive an indication of a selection of a portable document format (PDF) file to be loaded on the presenter compute device, the PDF file having a set of pages and a set of tags.

At 203, the control compute device can be configured to format, on a per-page basis, at least one page from the set of pages of the PDF file to at least one scalable vector graphics (SVG) representation from a set of SVG representations such that the at least one SVG representation from the set of SVG representations is stored in the browser cache of the presenter compute device. At 204, the control compute device can be configured to store an association of the set of tags with the set of SVG representations. At 205, the control compute device can be configured to upload the set of SVG representations and the set of tags to a synchronized mesh server endpoint. The synchronized mesh server endpoint can be configured to establish a session (e.g., a chat session) between the presenter compute device and the set of audience compute devices. The synchronized mesh server endpoint can be configured further to send the at least one SVG representation from the set of SVG representations to the presenter compute device and the set of audience compute devices. The synchronized mesh server endpoint can be configured further to send an end-of-session message to the presenter compute device and the set of audience compute devices to clear (erase, delete, remove or write over) the application from the browser cache of the presenter compute device and the browser cache of each audience compute device from the set of audience compute devices, in response to receiving the end-of-session message.

FIG. 3 is a flowchart of a method 300 of communication via a synchronized mesh server endpoint (such as the synchronized mesh server endpoint 150 as shown and described with respect to FIG. 1), according to an embodiment. At 301, a presenter compute device (such as the presenter compute device 111 as shown and described with respect to FIG. 1) can be connected, via an application (such as the application 115 as shown and described with respect to FIG. 1) stored in a browser cache of the presenter compute device, to a synchronized mesh server endpoint that is configured to establish a session (e.g., a chat session) between the presenter compute device and a set of audience compute devices (such as the set of audience compute devices 121 as shown and described with respect to FIG. 1). The application can received from a control compute device such as the control compute device 101 as shown and described with respect to FIG. 1. At 302, the presenter compute device can be configured to format each page from a set of pages of a portable document format (PDF) to a unique scalable vector graphics (SVG) representation from a set of SVG representations, such that the set of SVG representations are stored in the browser cache in response to the set of pages being formatted, the PDF file including the set of pages and a set of tags. The application of the presenter compute device can include a PDF rendering process library (as described above with respect to FIG. 1) that formats the set of pages to a set of SVG representations on a per-page basis. At 303, the presenter compute device can be configured to upload the set of SVG representations and the set of tags to the synchronized mesh server endpoint. At 304, the presenter compute device can be configured to clear the application from the browser cache, after the uploading and in response to receiving an end-of-session message from the synchronized mesh server endpoint.

Figure 4:
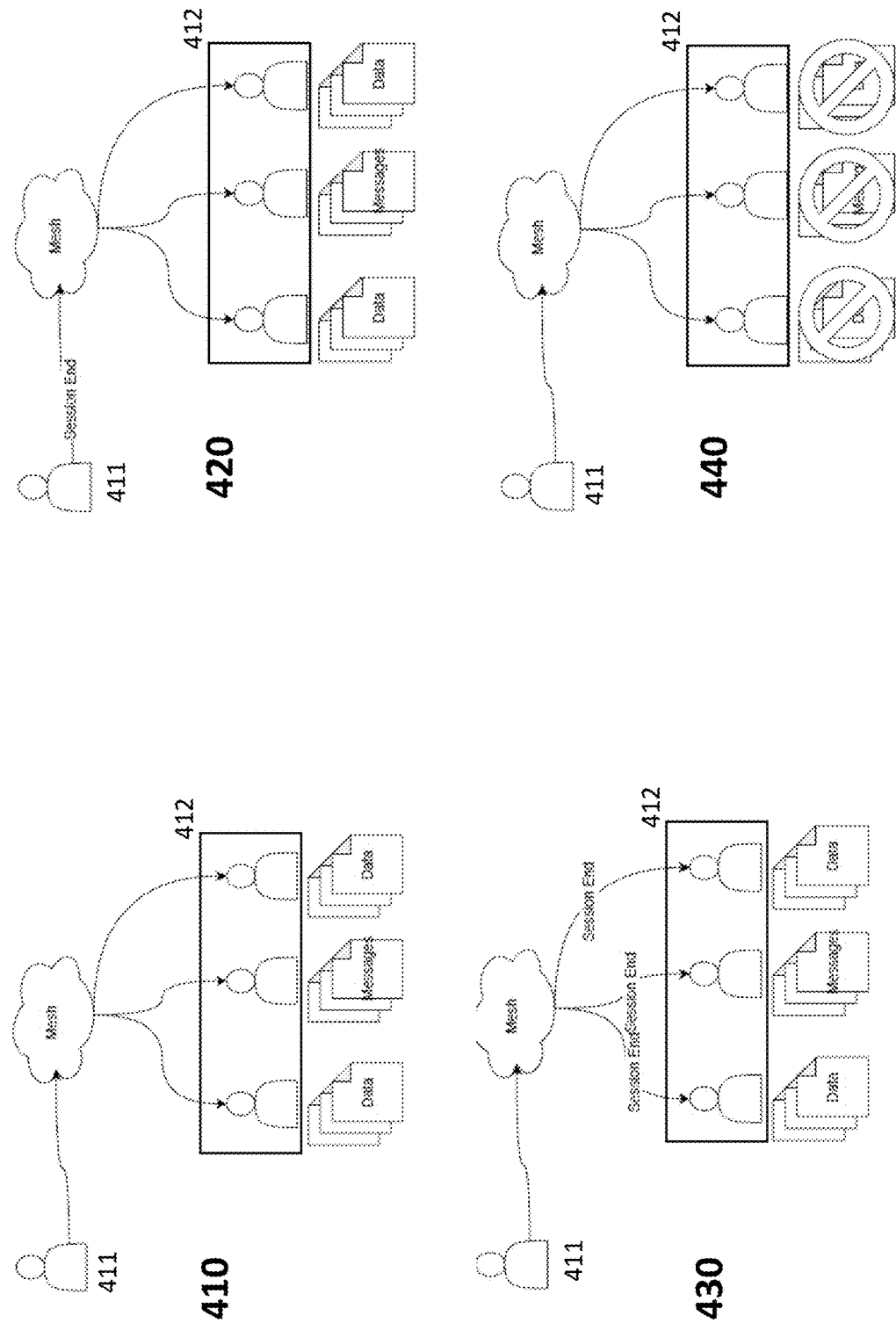
FIG. 4 is a block diagram that illustrate a web conferencing system, according to an embodiment.

FIG. 4 is a block diagram that illustrate examples of using a web conferencing system, according to an embodiment. A mesh (such as the synchronized mesh server endpoint 150 as shown and describe with respect to FIG. 1) establishes a session between a set of compute devices that can include a presenter compute device 411 (such as the presenter compute device 111 as shown and describe with respect to FIG. 1) and a set of audience compute devices 412 (such as the set of audience compute device 121 as shown and describe with respect to FIG. 1). Each compute device from the set of compute device can include an application loaded in a browser cache of a W3C compliant browser of the compute device, and running a session hosted in the mesh, as shown in 410. The mesh can receive an indication of end-of-session, as shown in 420 (e.g., from a user of the presenter compute device 411). The mesh can consequently generate the end-of-session message and transmit the end-of-session message to the presenter compute device 411 and/or the set of audience compute devices 412, as shown in 430. On receipt of an end-of-session message from each compute device from the set of compute devices can clear the application, all messages, all references, and all files received during the session from their respective memories, as shown in 440. Moreover, the mesh and the set of compute devices can further disconnect from any temporary websocket. Therefore, the application has no lasting trace on the browser cache of each compute device, after receiving the end-of-session message.

FIG. 5 is a block diagram that illustrate examples of using a web conferencing system, according to an embodiment. An audience compute device 513 from a set of audience compute devices 512 (such as the set of audience device 121 as shown and described with respect to FIG. 1) joins a session (e.g., a chat session) after the remaining audience device from the set of audience device 512, and after a set of chat messages have been uploaded to the mesh (such as the synchronized mesh server endpoint 150 as shown and described with respect to FIG. 1), a set of files have been uploaded to an API storage, and the set of messages and the set of files have been shared with the remaining audience devices. When the audience compute device joins the session at any point in time (e.g., mid-session) during the session, the mesh will transmit all chat messages from the set of chat messages (replay all previous messages) to the audience compute device 513 from a memory of the mesh, as shown in 510. Then, an API can transmit a set of files to the audience compute device 513, as shown in 520. In one example, the audience compute device 513 can request and receive, from the API, files of a session held previously (e.g., two month ago) and after the session has ended.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A non-transitory processor-readable medium storing code representing instructions to be executed by a processor, the code comprising code to cause the processor to: load in a browser cache an application that is configured to:
   a) connect, via a secured connection, to a synchronized mesh server endpoint that is configured to establish a session including a plurality of audience compute devices;
   b) receive an indication of a selection of a portable document format (PDF) file to be loaded to the synchronized mesh server endpoint, the PDF file having a plurality of pages and a first plurality of tags;
   c) separate the plurality of pages of the PDF file to produce a plurality of separated pages;
   d) format each page from the plurality of separated pages to a unique scalable vector graphics (SVG) representation from a plurality of SVG representations, such that the plurality of SVG representations are stored in the browser cache in response to the plurality of separated pages being formatted;
   e) detect the first plurality of tags included in the plurality of SVG representations and that includes one or more references to the PDF file;
   (f) replace the first plurality of tabs with a second plurality of tags that substitutes the one or more references to the PDF file with a binary large object (blob); and
   g) upload the plurality of SVG representations to the synchronized mesh server endpoint that stores the plurality of SVG representations, in response to the plurality of SVG representations being uploaded, in a remote encrypted storage that confirms integrity of each SVG representation from the plurality of SVG representations,
   the plurality of SVG representation stored in the remote encrypted storage being accessible by the synchronized mesh server endpoint and not being accessible to the non-transitory processor-readable medium or the plurality of audience devices; and
   clear the application from the browser cache, in response to receiving an end-of-session message from the synchronized mesh server endpoint.

2. The non-transitory processor-readable medium of claim 1, wherein the application is further configured to: store, in the browser cache and after the plurality of SVG representations are formatted from the plurality of separated pages, an association of the first plurality of tags with the plurality of SVG representations.

3. The non-transitory processor-readable medium of claim 1, wherein the application is further configured to: exchange a plurality of messages including a plurality of chat messages and the first plurality of tags, in the session.

4. The non-transitory processor-readable medium of claim 1, wherein:
   at least one audience compute device from the plurality of audience compute devices joining the session after the application uploads the plurality of SVG representations to the synchronized mesh server endpoint,
   the synchronized mesh server endpoint transmitting, to the at least one audience compute device, a plurality of messages exchanged between the plurality of audience devices other than the at least one audience compute device before the at least one audience compute device joining the session.

5. The non-transitory processor-readable medium of claim 1, wherein the application is loaded temporarily in the browser cache and a browser cache of each audience compute device from the plurality of audience compute devices.

6. The non-transitory processor-readable medium of claim 1, wherein the application has no lasting trace on the browser cache after receiving the end-of-session message and no lasting trace on the plurality of audience compute devices after each audience compute device from the plurality of audience compute devices receives an instantiation of the end-of-session message.

7. The non-transitory processor-readable medium of claim 1, wherein
the binary large object (blob) is a 64 encoded binary large object (blob).

8. The non-transitory processor-readable medium of claim 1, wherein the secured connection is established over a transport layer security (TLS) secured websocket connection.

9. A method, comprising:
sending an application from a control compute device to a presenter compute device and a plurality of audience compute devices, to cause the application to load in a browser cache of the presenter compute device and a browser cache of each audience compute device from the plurality of audience compute devices, in response to receiving the application;
receiving an indication of a selection of a portable document format (PDF) file to be loaded on the presenter compute device, the PDF file having a plurality of pages and a first plurality of tags;
formatting, on a per-page basis, at least one page from the plurality of pages of the PDF file to at least one scalable vector graphics (SVG) representation from a plurality of SVG representations such that the at least one SVG representation from the plurality of SVG representations is stored in the browser cache of the presenter compute device, the application being configured to (1) detect the first plurality of tags that is included in the plurality of SVG representations and that includes one or more references to the PDF file, and (2) replace the first plurality of tags with a second plurality of tags that substitutes the one or more references to the PDF file with one or more binary large objects (blobs); and
uploading the plurality of SVG representations and the second plurality of tags to a synchronized mesh server endpoint to cause the synchronized mesh server endpoint to:
a) store the plurality of SVG representations in a remote encrypted storage that confirms integrity of each SVG representation, wherein the plurality of SVG representation stored in the remote encrypted storage being accessible by the synchronized mesh server endpoint and not to any of the control compute device, presenter compute device, or the plurality of audience devices,
b) fetch at least one SVG representation from the plurality of SVG representations from the remote encrypted storage to send to the presenter compute device or an audience device from the plurality of audience compute devices, and
c) send an end-of-session message to the presenter compute device and the plurality of audience compute devices to clear the application from the browser cache of the presenter compute device and the browser cache of each audience compute device from the plurality of audience compute devices in response to receiving the end-of-session message.

10. The method of claim 9, wherein:
at least one audience compute device from the plurality of audience compute devices joins a session after the synchronized mesh server endpoint sends the at least one SVG representation from the plurality of SVG representations to the presenter compute device and the plurality of audience compute devices,
the synchronized mesh server endpoint transmitting, to the at least one audience compute device, a plurality of messages exchanged between the plurality of audience devices other than the at least one audience compute device before the at least one audience compute device joining the session.

11. The method of claim 9, wherein at least one audience compute device from the plurality of audience compute devices joins a session (1) after the synchronized mesh server endpoint sends the at least one SVG representation from the plurality of SVG representations to the presenter compute device and the plurality of audience compute devices, and (2) before the synchronized mesh server endpoint sends an end-of-session message to the presenter compute device and the plurality of audience compute devices.

12. The method of claim 9, wherein the application is loaded temporarily in the browser cache of the presenter compute device and the browser cache of each audience compute device from the plurality of audience compute devices.

13. The method of claim 9, wherein the application has no lasting trace on the presenter compute device and the plurality of audience compute devices.

14. The method of claim 9, wherein one or more binary large object (blobs) are one or more 64 encoded binary large objects (blobs).

15. The method of claim 9, wherein the presenter compute device and each audience compute device have at least one browser that complies with at least one standard defined by the World Wide Web Consortium (W3C).

16. A method, comprising:
connecting, via an application stored in a browser cache of a presenter compute device, to a synchronized mesh server endpoint that is configured to establish a session between the presenter compute device and a plurality of audience compute devices;
separating a plurality of pages of a portable document format (PDF) file to produce a plurality of separated pages, the PDF file includes a first plurality of tau;
formatting each page from the plurality of separated pages of the PDF file to a unique scalable vector graphics (SVG) representation from a plurality of SVG representations, such that the plurality of SVG representations are stored in the browser cache in response to the plurality of separated pages being formatted, the PDF file including the plurality of separated pages;
detecting the first plurality of tau included in the plurality of SVG representations and that includes one or more references to the PDF file;
replacing the first plurality of tau with a second plurality of tags that substitutes the one or more references to the PDF file with a binary large object (blob);
uploading the plurality of SVG representations to the synchronized mesh server endpoint that stores the plurality of SVG representations, in response to the plurality of SVG representations being uploaded, in a remote encrypted storage that confirms integrity of each SVG representation,
the plurality of SVG representations stored in the remote encrypted storage being accessible by the synchronized mesh server endpoint and not being accessible to the presenter compute device or the plurality of audience compute devices; and clearing the application from the browser cache, after the uploading and in response to receiving an end-of-session message from the synchronized mesh server endpoint.

17. The method of claim 16, the method further comprising:

exchanging a plurality of messages including a plurality of chat messages and the first plurality of tags, in the session, a reception of an indication of each message from the plurality of messages triggering the presenter compute device and the plurality of audience compute devices to fetch each message.

18. The method of claim 16, wherein at least one audience compute device from the plurality of audience compute devices joins the session after the synchronized mesh server endpoint uploads the plurality of SVG representations to the synchronized mesh server endpoint.

19. The method of claim 16, wherein the application is loaded temporarily in the browser cache of the presenter compute device and a cache of each audience compute device from the plurality of audience compute devices.

20. The method of claim 16, wherein the application has no lasting trace on the presenter compute device and the plurality of audience compute devices.

21. A method comprising:

connecting, via a secured connection, to a plurality of compute devices each compute device of which is configured to load in a browser cache of that compute device an application that is configured to (a) separate a plurality of pages of a portable document format (PDF) file having a first plurality of tags to produce a plurality of separated PDF pages, (b) format each separated PDF page from the plurality of separated PDF pages to produce a unique scalable vector graphics (SVG) representation from a plurality of SVG representations, detect the first plurality of tags included in the plurality of SVG representations and that includes one or more references to the PDF file, and (d) replace the first plurality of tags with a second plurality of tags that substitutes the one or more references to the PDF file with a binary large object (blob), such that the plurality of SVG representations for that compute device are stored in the browser cache of that compute device in response to the plurality of separated PDF pages being formatted;

establish a session between the plurality of compute devices;

receive, during the session, the plurality of SVG representations from a compute device from the plurality of compute device;

validate the plurality of SVG representations to produce a plurality of validated SVG representations;

regroup the plurality of validated SVG representations into a regrouped SVG representation; and store the regrouped SVG representation in an encrypted storage that confirms integrity of each SVG representation from the regrouped SVG representation, the regrouped SVG representation stored in the remote encrypted storage being accessible by the synchronized mesh server endpoint and not being accessible to the plurality of audience compute devices.

* * * * *